(12) United States Patent
Kim

(10) Patent No.: US 10,971,773 B2
(45) Date of Patent: Apr. 6, 2021

(54) COOLING DUCT OF HIGH VOLTAGE BATTERY SYSTEM OF VEHICLE

(71) Applicants: Hyundai Motor Company, Seoul (KR); Kia Motors Corporation, Seoul (KR)

(72) Inventor: Kyung Ho Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 138 days.

(21) Appl. No.: 16/284,686

(22) Filed: Feb. 25, 2019

(65) Prior Publication Data

US 2020/0176837 A1 Jun. 4, 2020

(30) Foreign Application Priority Data

Dec. 4, 2018 (KR) .................. 10-2018-0154108

(51) Int. Cl.
*H01M 10/6552* (2014.01)
*H01M 10/613* (2014.01)
*H01M 10/625* (2014.01)
*B60K 6/28* (2007.10)

(52) U.S. Cl.
CPC ..... *H01M 10/6552* (2015.04); *H01M 10/613* (2015.04); *H01M 10/625* (2015.04); *B60K 6/28* (2013.01); *B60Y 2200/92* (2013.01); *B60Y 2306/05* (2013.01); *B60Y 2400/112* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2012/0181827 A1* | 7/2012 | Aoki | B60K 1/04 297/217.3 |
| 2016/0137094 A1 | 5/2016 | Yoda | |
| 2018/0050606 A1 | 2/2018 | Sugitate | |

FOREIGN PATENT DOCUMENTS

| | | |
|---|---|---|
| JP | 2010-145003 A | 7/2010 |
| KR | 20120061666 A | 6/2012 |

* cited by examiner

*Primary Examiner* — Daniel S Gatewood
(74) *Attorney, Agent, or Firm* — Mintz Levin Cohn Ferris Glovsky and Popeo, P.C.; Peter F. Corless

(57) ABSTRACT

A cooling duct of a high voltage battery system of a vehicle is provided. The cooling duct includes a duct body that forms an inlet open towards the interior of the vehicle and an outlet that is formed at a side of the duct body opposite to the inlet to supply air introduced into the cooling duct through the inlet to a high voltage battery. A blocking wall is formed between the inlet and the outlet to restrict rectilinear communication between the inlet and the outlet while allowing air flow between the inlet and the outlet.

9 Claims, 4 Drawing Sheets

COOLING DUCT OF HIGH VOLTAGE BATTERY SYSTEM OF VEHICLE

CROSS-REFERENCE TO RELATED APPLICATION

This application claims the priority benefit of Korean Patent Application No. 10-2018-0154108, filed on Dec. 4, 2018, the disclosure of which is incorporated herein by reference.

BACKGROUND

1. Field of the Invention

The present invention relates to a duct structure for cooling a high voltage battery system mounted within a vehicle, and more particularly, to a cooling duct of a high voltage battery system that prevents high frequency noise generated from the battery form being introduced into the vehicle through an intake duct.

2. Description of the Related Art

In an environmentally friendly vehicle such as a hybrid vehicle, an electric vehicle, or a plug-in hybrid vehicle, driving force is generated by a motor. The vehicle includes a high voltage battery that supplies power to the motor and a cooling apparatus that effectively removes heat generated from the high voltage battery. Both a water cooling-type cooling method and an air cooling-type cooling method may be used to cool high voltage batteries. The air cooling-type cooling method is comparatively simple and lightweight and is thus more widely used. The air cooling-type cooling method requires an intake duct to suction air necessary to cool a high voltage battery, and an exhaust duct to exhaust air after cooling of the high voltage battery.

In general, the intake duct is open towards the interior of a vehicle to suction air from the interior of the vehicle, and the exhaust duct is open towards the outside of the vehicle to exhaust air to the outside of the vehicle. To drive the motor using power of the above-described high voltage battery, an inverter is used, and the inverter converts direct current (DC) to alternating current (AC) through rapid switching of a switching element.

A current ripple is generated due to the switching action of the inverter and the generated current ripple current causes high frequency noise via a high voltage part, particularly, a high voltage battery system mounted within the interior of a vehicle. When the high frequency noise is introduced into the interior of the vehicle through the intake duct, the high frequency noise causes passenger's displeasure and thus lowers marketability of the vehicle.

The above description has been provided to aid in understanding of the background of the present invention and should not be interpreted as conventional technology known to those skilled in the art.

SUMMARY

Therefore, the present invention provides a cooling duct of a high voltage battery system of a vehicle which may effectively prevent high frequency noise generated from a high voltage battery from being introduced into the interior of the vehicle through an intake duct to prevent passenger's displeasure and to enhance marketability of the vehicle.

In accordance with the present invention, the above and other objects can be accomplished by the provision of a cooling duct of a high voltage battery system of a vehicle that may include a duct body that forms an inlet open towards the interior of the vehicle, an outlet formed at a side of the duct body opposite to the inlet to supply air introduced into the cooling duct through the inlet to a high voltage battery, and a blocking wall formed between the inlet and the outlet to restrict rectilinear communication between the inlet and the outlet while allowing air flow between the inlet and the outlet.

In particular, the blocking wall may be formed to have a linear shape inclined relative to the inlet. The blocking wall may be formed to be inclined at an angle of about 35° to 55° relative to the inlet. Additionally, the blocking wall may be spaced apart from the center of the inlet by a shortest distance of about 40 mm to 60 mm. The blocking wall may be arranged with a first end connected to an inner surface of the duct body and a second end spaced apart from the inner surface of the duct body.

A depression may be formed between the blocking wall and the inlet of the duct body to form a curved air flow path from the inlet to the outlet. The depression of the duct body may be formed at a part of the duct body, where the blocking wall is spaced apart from the inner surface of the duct body. Accordingly, air introduced into the cooling duct through the inlet may flow along an S-type curve through the depression and the blocking wall. A sound-absorbing material passing air may be installed at the outlet of the duct body.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
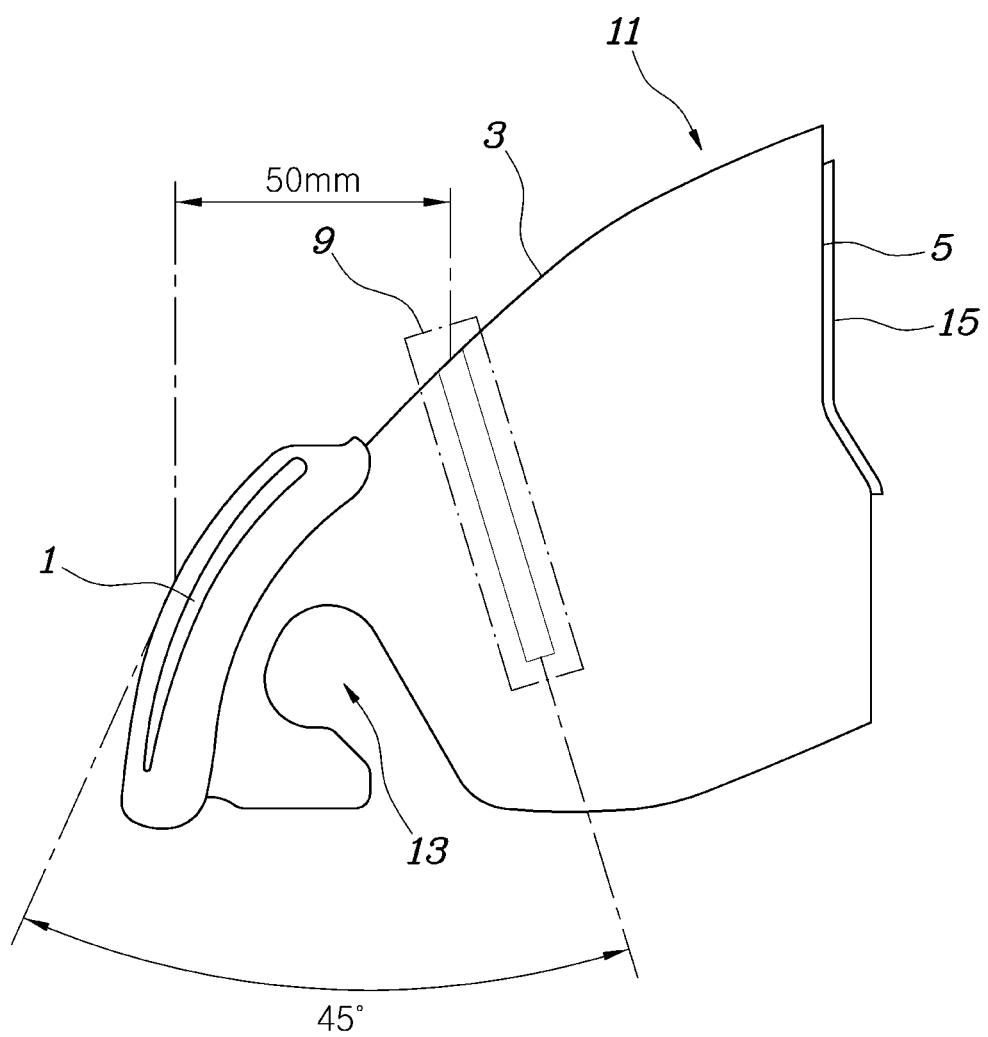
FIG. 1 is a view illustrating a cooling duct of a high voltage battery system of a vehicle in accordance with an exemplary embodiment of the present invention.
Figure 2:
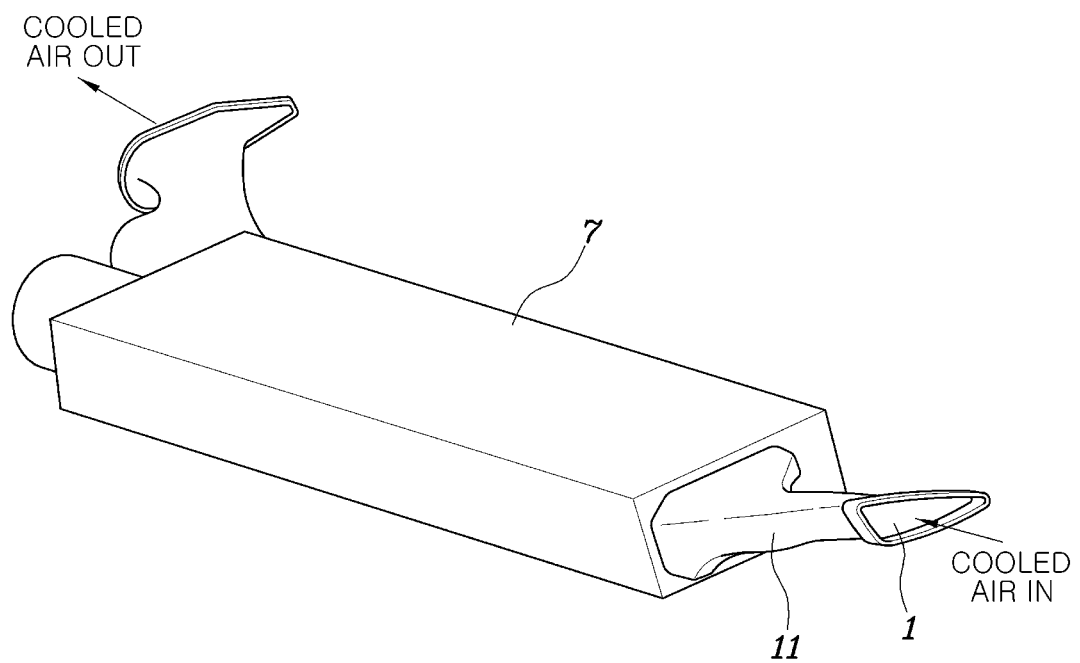
FIG. 2 is a view illustrating the cooling duct in accordance with an exemplary embodiment of the present invention, mounted on the high voltage battery system.
Figure 3:
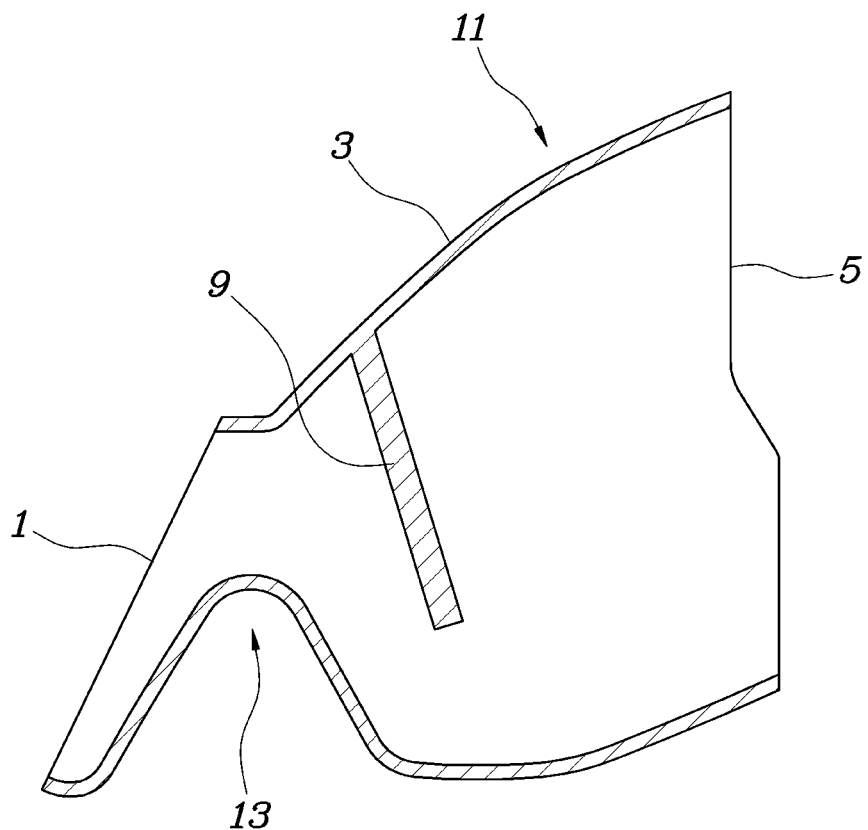
FIG. 3 is a cross-sectional view of the cooling duct of FIG. 1 in accordance with an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. Wherever possible, the same reference numbers will be used throughout the drawings to refer to the same or like parts.

Referring to FIGS. 1 to 4, a cooling duct 11 of a high voltage battery system of a vehicle in accordance with one exemplary embodiment of the present invention may include a duct body 3 that forms an inlet 1 that is open towards the interior of the vehicle, an outlet 5 formed at a side of the duct body 3 opposite to the inlet 1 to supply air introduced into the cooling duct 11 through the inlet 1 to a high voltage battery 7, and a blocking wall 9 formed between the inlet 1 and the outlet 5 to restrict rectilinear communication between the inlet 1 and the outlet 5 while allowing air flow between the inlet 1 and the outlet 5.

In other words, the cooling duct 11 in accordance with the present invention is an intake duct that suctions air from the interior of the vehicle to cool the high voltage battery 7. The blocking wall 9 may be disposed between the inlet 1 and the outlet 5 formed at the duct body 3 and thus may block high frequency noise having high linearity generated from the high voltage battery 7 to prevent the high frequency noise from flowing into the interior of the vehicle through the inlet 1.

In this exemplary embodiment, the blocking wall 9 may be formed to have a linear shape inclined relative to the inlet 1. In other words, as exemplarily shown in these figures, the blocking wall 9 may be formed to have a linear shape inclined at an angle of about 35° to 55° relative to the inlet 1. Further, the blocking wall 9 may be spaced apart from the center of the inlet 1 by a shortest distance of about 40 mm to 60 mm. In particular, the blocking wall 9 may be spaced apart from the inlet 1 by a designated distance, particularly, the blocking wall 9 may be arranged with a first end of the blocking wall 9, i.e., an upper end of the blocking wall 9, spaced apart from the center of the inlet 1 by a distance of about 50 mm.

The first end of the blocking wall 9 may be connected to the inner surface of the duct body 3, and a second end of the blocking wall 9 may be spaced apart from the inner surface of the duct body 3. As exemplarily shown in FIG. 3, the upper end of the blocking wall 9 may be formed integrally with the duct body 3 to be connected to the inner surface of the duct body 3. The lower end of the blocking wall 9 may be spaced apart from the inner surface of the duct body 3 to form an air passage.

Additionally, a depression 13 (e.g., groove) may be formed between the blocking wall 9 and the inlet 1 of the duct body 3 and thus may form a curved air flow path from the inlet 1 to the outlet 5. In other words, after entering the inlet 1, the air is forced over the depression 13 and then under the blocking wall 9 in an S-shaped curve of a flow path toward the outlet 5. As exemplarily shown in FIG. 3, the depression 13 of the duct body 3 may be formed at the lower part of the duct body 3 where the blocking wall 9 is spaced apart from the inner surface of the duct body 3. Accordingly, air introduced into the cooling duct 11 through the inlet 1 may flow along an S-type curve through the depression 13 and the blocking wall 9.

Figure 4:
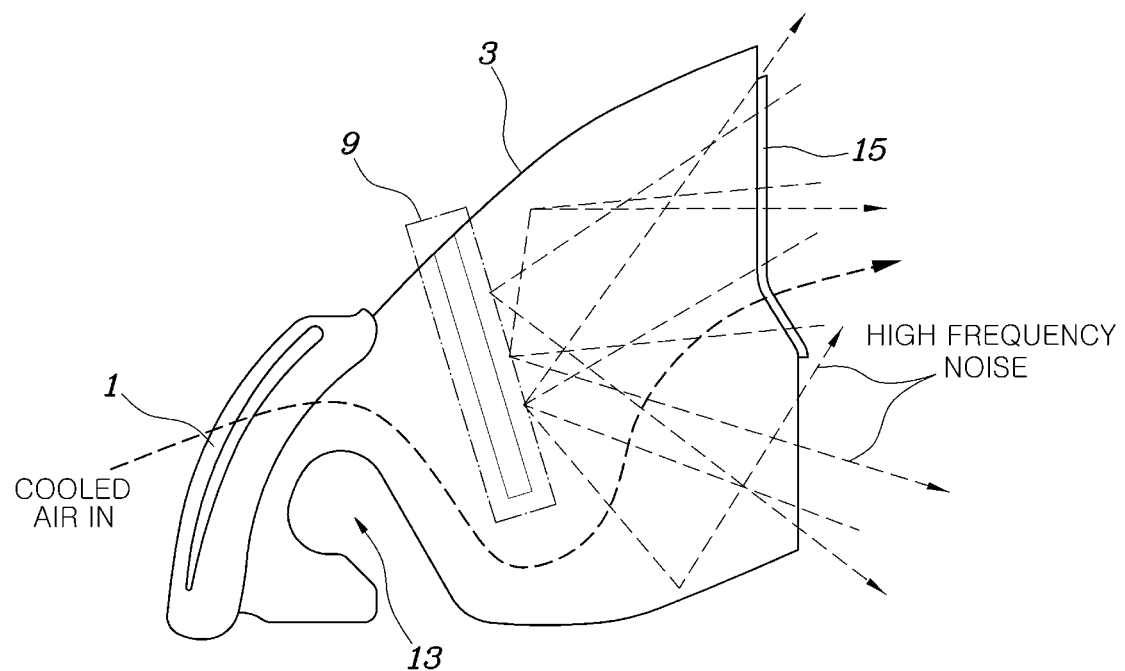
FIG. 4 is a view illustrating a high frequency noise blocking effect of the cooling duct of FIG. 1 in accordance with an exemplary embodiment of the present invention.

Therefore, as exemplarily shown in FIG. 4, since the flow of air to cool the high voltage battery 7 may be connected from the inlet 1 of the duct body 3 to the outlet 5 along the S-type curve, high frequency noise entering from the outlet 5 may be prevented from passing through the S-type curve and may be blocked by the blocking wall 9. Accordingly, leakage of high frequency noise to the interior of the vehicle through the inlet 1 may also be prevented.

Further, a sound-absorbing material 15 through which air may pass may be installed at the outlet 5 of the duct body 3. As exemplarily shown in FIG. 1, the sound-absorbing material 15, through which air may flow to the high frequency battery 7 through the outlet 5 may absorb noise from the high frequency battery 7. In addition, the sound-absorbing material 15 may be installed at the outlet 5 or thereround (e.g., around, surrounding the outlet 5), thus may more effectively prevent transmission of noise to the interior of the vehicle.

As is apparent from the above description, a cooling duct of a high voltage battery system of a vehicle in accordance with the present invention may effectively prevent high frequency noise generated from a high voltage battery from being introduced into the interior of the vehicle through an intake duct, thus preventing passenger's displeasure and enhancing marketability of the vehicle.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling duct of a high voltage battery system of a vehicle, comprising:
   a duct body that forms an inlet open towards an interior of the vehicle;
   an outlet formed at a side of the duct body opposite to the inlet to supply air introduced into the cooling duct through the inlet to a high voltage battery; and
   a blocking wall formed between the inlet and the outlet to restrict rectilinear communication between the inlet and the outlet while allowing air flow between the inlet and the outlet,
   wherein a depression is formed between the blocking wall and the inlet of the duct body and forms a curved air flow path from the inlet to the outlet.

2. The cooling duct according to claim 1, wherein the blocking wall is formed to have a linear shape inclined relative to the inlet.

3. The cooling duct according to claim 2, wherein the blocking wall is formed to be inclined at an angle of about 35° to 55° relative to the inlet.

4. The cooling duct according to claim 2, wherein the blocking wall is spaced apart from a center of the inlet by a shortest distance of about 40 mm to 60 mm.

5. The cooling duct according to claim 2, wherein the blocking wall includes a first end of the blocking wall connected to an inner surface of the duct body and a second end of the blocking wall spaced apart from the inner surface of the duct body.

6. The cooling duct according to claim 2, wherein an upper end of the blocking wall is spaced apart from a center of the inlet by a distance of about 50 mm.

7. The cooling duct according to claim 1, wherein the depression of the duct body is formed at a part of the duct body, where the blocking wall is spaced apart from the inner surface of the duct body, and thus causes air introduced into the cooling duct through the inlet to flow along an S-type curve through the depression and the blocking wall.

8. The cooling duct according to claim 1, wherein a sound-absorbing material passing air is installed at the outlet of the duct body.

9. The cooling duct according to claim 8, wherein the sound-absorbing material is formed around the outlet of the duct body.

\* \* \* \* \*